US008848235B2

(12) United States Patent
Shibata

(10) Patent No.: US 8,848,235 B2
(45) Date of Patent: Sep. 30, 2014

(54) SYSTEMS AND METHODS FOR DISPLAYING A PRINT PREVIEW

(71) Applicant: Canon Kabushiki Kaisha, Tokyo (JP)

(72) Inventor: Daisuke Shibata, Kawaski (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/719,006

(22) Filed: Dec. 18, 2012

(65) Prior Publication Data

US 2013/0155438 A1 Jun. 20, 2013

(30) Foreign Application Priority Data

Dec. 20, 2011 (JP) ................................ 2011-278700

(51) Int. Cl.
*G06K 15/00* (2006.01)
*H04N 1/387* (2006.01)

(52) U.S. Cl.
CPC ........... *H04N 1/3877* (2013.01); *H04N 1/3875* (2013.01)
USPC .......................... 358/1.18; 358/1.12; 358/1.13

(58) Field of Classification Search
CPC ...................................................... G06F 3/125
USPC ................................................. 358/1.1–1.18
See application file for complete search history.

(56) References Cited

U.S. PATENT DOCUMENTS

| | | | | |
|---|---|---|---|---|
| 5,694,486 A * | 12/1997 | Shigeeda et al. | ............. | 382/197 |
| 8,482,788 B2 * | 7/2013 | Yoshida | .......................... | 358/1.2 |
| 8,610,938 B2 * | 12/2013 | Seikh et al. | .................. | 358/1.15 |
| 2001/0014184 A1 * | 8/2001 | Bubie et al. | .................... | 382/293 |
| 2004/0017577 A1 * | 1/2004 | Ostrover et al. | .................. | 358/1.8 |
| 2007/0201053 A1 * | 8/2007 | Sellers et al. | .................. | 358/1.2 |
| 2012/0120421 A1 * | 5/2012 | Mochizuki et al. | ............ | 358/1.9 |

FOREIGN PATENT DOCUMENTS

JP 2003-241452 A 8/2003

* cited by examiner

*Primary Examiner* — Dennis Dicker
(74) *Attorney, Agent, or Firm* — Canon U.S.A., Inc., IP Division

(57) ABSTRACT

An image processing apparatus includes a reading unit configured to read a document to generate a document image, a determination unit configured to determine whether rotation processing for rotating the document image is to be performed when printing is performed based on the document image, and a display unit configured to display a print preview representing a printed result, wherein the display unit displays the print preview if the determination unit determines that the rotation processing is to be performed.

7 Claims, 15 Drawing Sheets

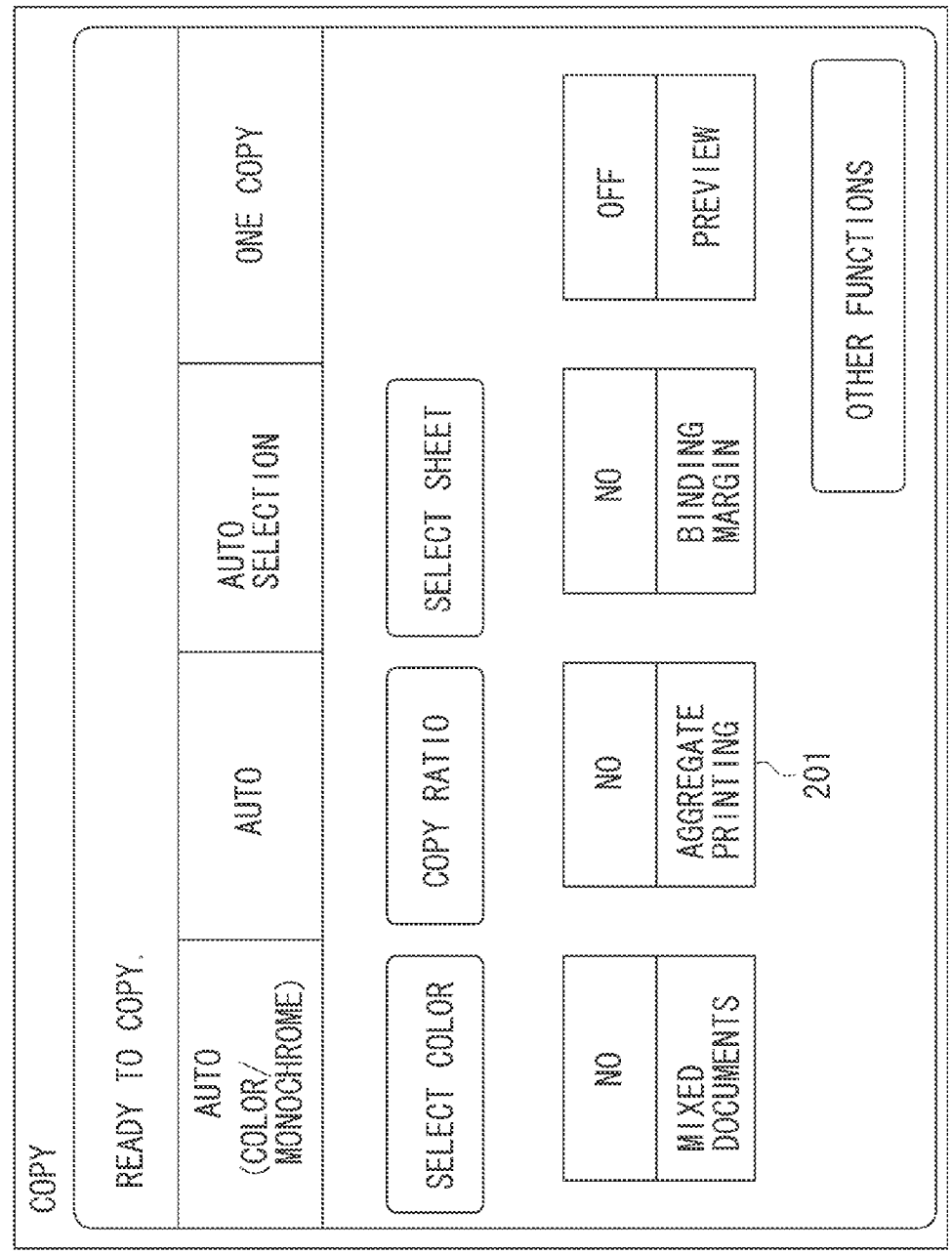

DOCUMENT PLACED ON SCANNER 108 OF IMAGE
PROCESSING APPARATUS 100 BY USER A

DOCUMENT IMAGE

SHEET ON WHICH AGGREGATE PRINTING
HAS BEEN PERFORMED

DOCUMENT PLACED ON SCANNER 108 OF IMAGE
PROCESSING APPARATUS 100 BY USER A

DOCUMENT IMAGE

SHEET ON WHICH AGGREGATE
PRINTING HAS BEEN PERFORMED

DOCUMENT PLACED ON SCANNER OF IMAGE PROCESSING APPARATUS 120 BY USER B

DOCUMENT IMAGE

SHEET ON WHICH AGGREGATE PRINTING HAS BEEN PERFORMED

DOCUMENT PLACED ON SCANNER 108 OF IMAGE PROCESSING APPARATUS 100 BY USER B

DOCUMENT IMAGE

SHEET ON WHICH AGGREGATE PRINTING HAS BEEN PERFORMED

710 PREVIEW SCREEN

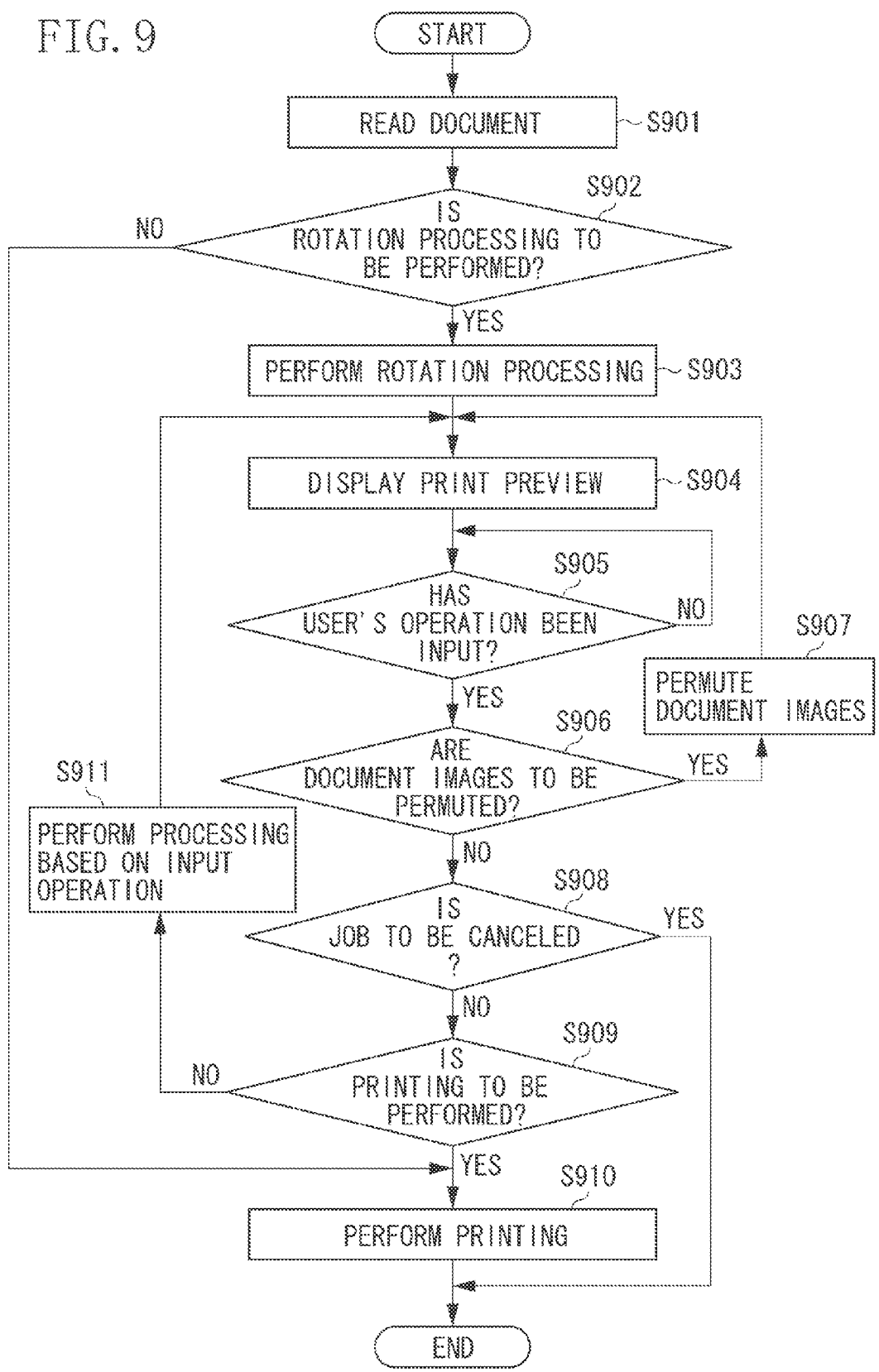

FIG. 10A
DOCUMENT PLACED ON SCANNER 108 OF IMAGE PROCESSING APPARATUS 100 BY USER A
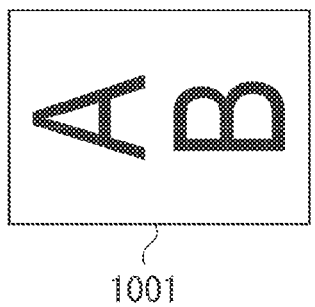
1001
FIG. 10B
DOCUMENT IMAGE
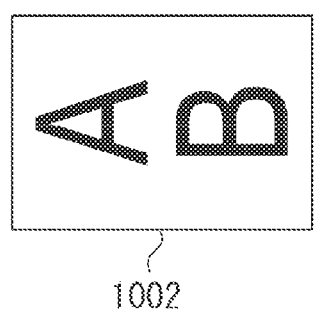
1002
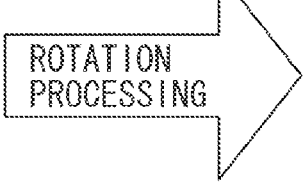
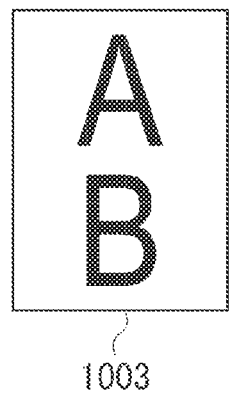
1003
FIG. 10C
SHEET ON WHICH PRINTING HAS BEEN PERFORMED
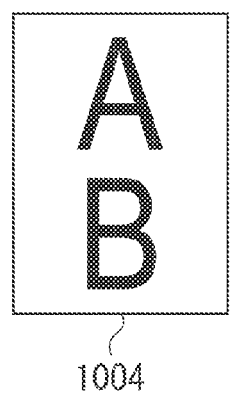
1004

DOCUMENT PLACED ON SCANNER 108 OF IMAGE PROCESSING APPARATUS 100 BY USER B

1101

DOCUMENT IMAGE 1102      1103

SHEET ON WHICH AGGREGATE PRINTING HAS BEEN PERFORMED 1104      1105

PRINTED RESULT INTENDED BY USER

1301

DOCUMENT PLACED ON SCANNER BY USER 1302  1303

DOCUMENT IMAGE 1304  1305  1306  1307

ACTUAL PRINTED RESULT 1308  1309

SYSTEMS AND METHODS FOR DISPLAYING A PRINT PREVIEW

BACKGROUND

1. Field of the Disclosure

Aspects of the present invention generally relate to an image processing apparatus that displays a print preview.

2. Description of the Related Art

Conventionally, a document image obtained by reading a document with a scanner can be printed on a sheet after rotation processing has been performed for the document image. More specifically, Japanese Patent Application Laid-Open No. 2003-241452, for example, discusses reading a document of A4 size to generate a document image of A4 size, and performing printing on a sheet of A4R size after performing rotation processing for the document image. Even if there is no sheet cassette storing sheets in an A4 orientation, therefore, printing can be performed using a sheet cassette storing sheets in an A4R orientation.

However, a printed result unintended by a user may be obtained by performing the rotation processing for the document image. A specific example will be described with reference to FIGS. 13A, 13B, 13C, and 13D.

A sheet 1301 illustrated in FIG. 13A indicates a printed result intended by a user. The user places a document 1302 and a document 1303 on a scanner, as illustrated in FIG. 13B, and further sets 2 in 1 (2-up) to issue an instruction to perform copying. The scanner reads the document 1302 and the document 1303, to respectively generate a document image 1304 and a document image 1305 illustrated in FIG. 13C. When printing is performed, rotation processing is performed for the document image 1304 and the document image 1305, to respectively obtain a document image 1306 and a document image 1307.

Printing is performed on the sheet 1301 based on the document images 1306 and 1307 obtained by the rotation processing. A printed result is a sheet 1308 illustrated in FIG. 13D. When the top and the bottom of the sheet 1308 are reversed, a sheet 1309 is obtained. When the sheet 1301 and the sheet 1309 are compared with each other, a printed result unintended by the user has been obtained by performing the rotation processing for the document images 1304 and 1305.

SUMMARY

An aspect of the present invention is directed to an image processing apparatus capable of preventing a printed result unintended by a user from being obtained.

According to an aspect of the present invention, an image processing apparatus includes a reading unit configured to read a document to generate a document image, a determination unit configured to determine whether rotation processing for rotating the document image is to be performed when printing is performed based on the document image, and a display unit configured to display a print preview representing a printed result, wherein the display unit displays the print preview if the determination unit determines that the rotation processing is to be performed.

Further features and aspects of the present disclosure will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 2A and 2B illustrate a copy screen and an aggregate printing screen, respectively, according to the first exemplary embodiment.

FIG. 9 is a flowchart relating to display of a print preview according to the first exemplary embodiment.

FIGS. 10A, 10B, and 10C illustrate an operation during copying according to a second exemplary embodiment.

DESCRIPTION OF THE EMBODIMENTS

Various exemplary embodiments, features, and aspects of the invention will be described in detail below with reference to the drawings.

Figure 1:
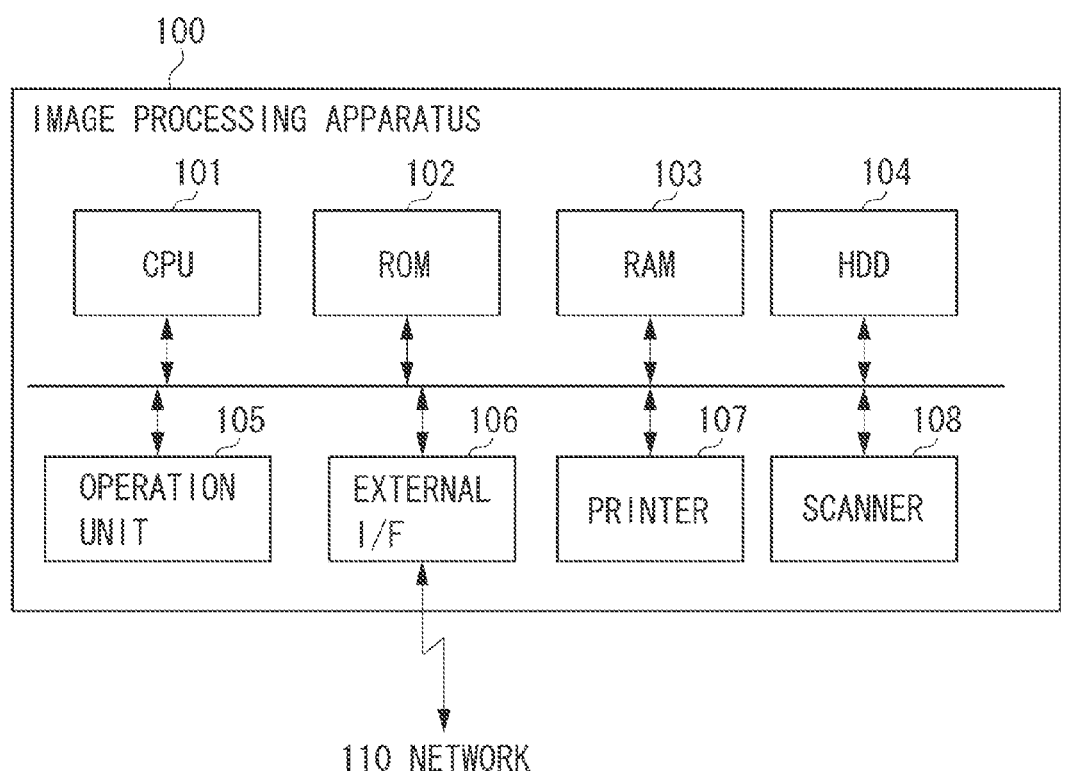
FIG. 1 illustrates a configuration of an image processing apparatus according to a first exemplary embodiment.

FIG. 1 illustrates a configuration of an image processing apparatus 100 according to a first exemplary embodiment. The image processing apparatus 100 according to the present exemplary embodiment is not limited to this, although a multifunction peripheral (MFP) is described as an example of the image processing apparatus 100. For example, the image processing apparatus 100 according to the present exemplary embodiment may be a single-function peripheral (SFP) such as a printer.

A central processing unit (CPU) 101 reads out a control program stored in a read-only memory (ROM) 102 and a hard disk drive (HDD) 104, to control the entire image processing apparatus 100. The ROM 102 stores information such as a control program for performing processing involved in a flowchart, described below, for example. A random access memory (RAM) 103 is used as a temporary storage area such as a main memory or a work area for the CPU 101. The HDD 104 stores information such as a control program, similarly to the ROM 102.

An operation unit 105 includes a display unit (e.g., a liquid crystal display unit having a touch panel function) and a keyboard. The operation unit 105 displays various operation screens, and transmits information, which has been input to a user, to the CPU 101 via the operation unit 105.

A scanner 108 reads a document to generate image data. The scanner 108 in the present exemplary embodiment is an automatic document feeder (ADF) that automatically feeds the document to a discharge tray from a document tray via a reading position. In the present exemplary embodiment, image data generated by reading the document with the scanner 108 is referred to as a document image.

A printer 107 performs print processing on a sheet based on a user's instruction input via the operation unit 105 and a command input from an external apparatus via an external interface (I/F) 106.

The external I/F 106 communicates with an external apparatus such as a personal computer (PC) or a server apparatus via a network 110.

Various operation screens displayed on the operation unit 105 will be described below.

The user presses a copy button (not illustrated) so that a copy screen 200 illustrated in FIG. 2A is displayed on the operation unit 105. The user can perform various copy settings relating to copying on the copy screen 200.

Aggregate printing (multiple-up printing or n-up printing) will be described as an example of the copy settings. The aggregate printing is the function of aggregating a plurality of document images to one sheet and printing the aggregated document images thereon. If the user desires to set the aggregate printing, the user selects (presses) a button 201 by a touch operation or the like.

Figure 2B:
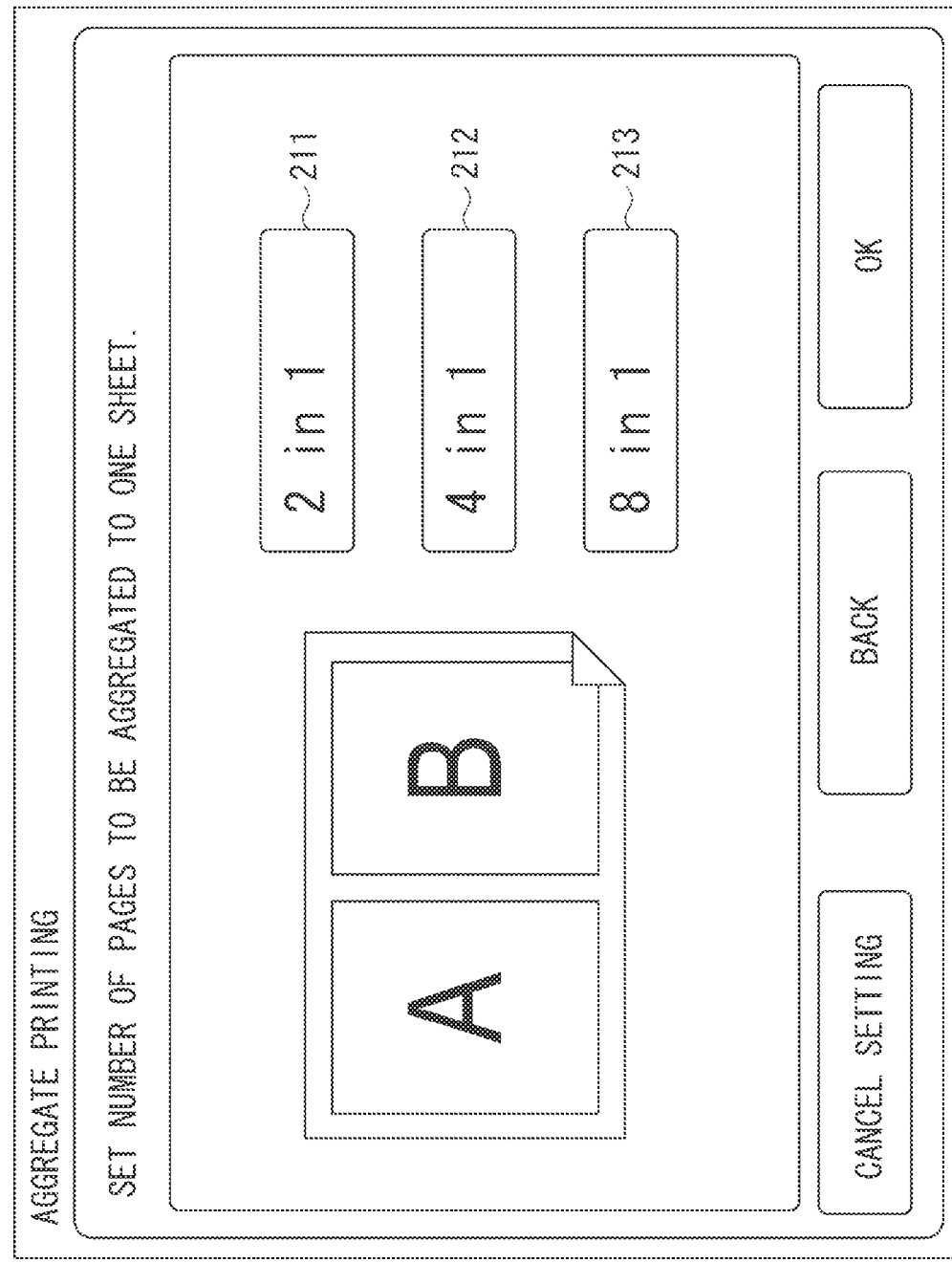

When the user selects the button 201, an aggregate printing screen 210 illustrated in FIG. 2B is displayed in the operation unit 105. Buttons 211, 212, and 213 are respectively used to set 2 in 1, 4 in 1, and 8 in 1 as the aggregate printing. 2 in 1 is a setting for aggregating two document images to one sheet and printing the aggregated document images thereon. Similarly, 4 in 1 is a setting for aggregating four document images to one sheet and printing the aggregated document images thereon, and 8 in 1 is a setting for aggregating eight document images to one sheet and printing the aggregated document images thereon. The user can set desired aggregate printing via the aggregate printing screen 210.

Figure 3A:
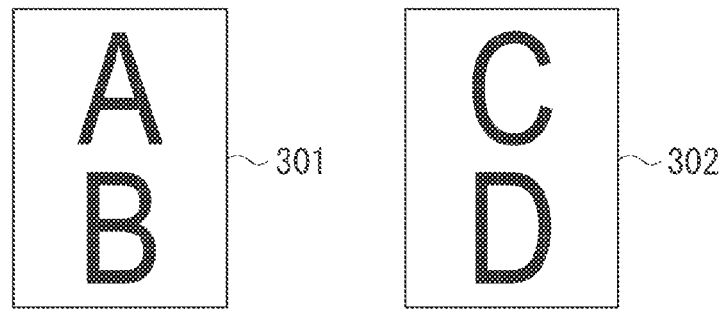
FIGS. 3A, 3B, and 3C illustrate an operation during copying according to the first exemplary embodiment.
Figure 3B:
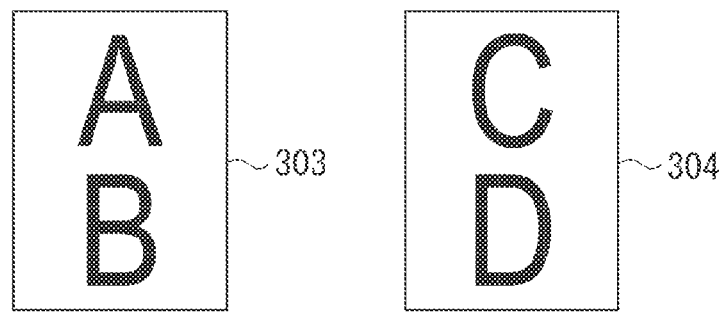
Figure 3C:
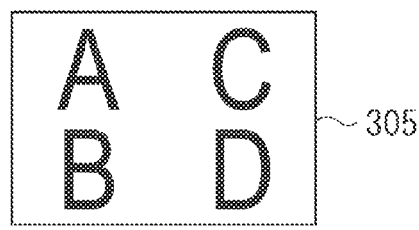

Handling of the document images will be described below with reference to FIGS. 3A to 3C through FIGS. 6A to 6C when the aggregate printing is set as the copy setting. FIGS. 3A to 3C illustrate a case where a user A performs copying using a document 301 and a document 302. The user A desires to obtain a printed result indicated by a sheet 305 (the size thereof is A4R) by performing the 2-in-1 aggregate printing.

The user A first places the document 301 and the document 302 on the scanner 108 of the image processing apparatus 100, as illustrated in FIG. 3A. At this time, the document 301 and the document 302 are placed on the scanner 108 in an A4 orientation. While the document 301 and the document 302 are arranged side by side in FIG. 3A so that their respective contents can be understood, the document 301 and the document 302 are actually placed one over the other on the scanner 108. While the documents to be placed on the scanner 108 are arranged side by side in the subsequent figures, the user actually places the documents one over the other on the scanner 108, like in FIG. 3A.

When the user A sets 2 in 1 using the button 211 on the aggregate printing screen 210 and presses a copy execution button (not illustrated), the scanner 108 reads the document 301 and the document 302, to respectively generate a document image 303 and a document image 304 illustrated in FIG. 3B. The document images 303 and 304 respectively correspond to the document 301 and the document 302. At this time, rotation processing, described below in FIGS. 4A to 4C, is not performed for document image 303 and the document image 304.

When the document images 303 and 304 are generated, the printer 107 performs printing based on the setting as the aggregate printing. The sheet 305 illustrated in FIG. 3C is a sheet on which printing has been performed. In an example illustrated in FIGS. 3A to 3C, the user A can obtain a desired printed result.

Figure 4A:
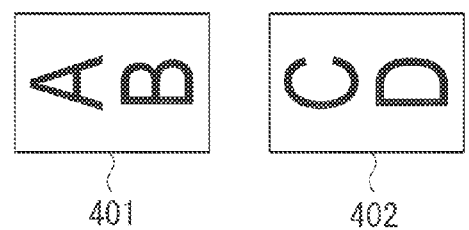
FIGS. 4A, 4B, and 4C illustrate an operation during copying according to the first exemplary embodiment.
Figure 4B:
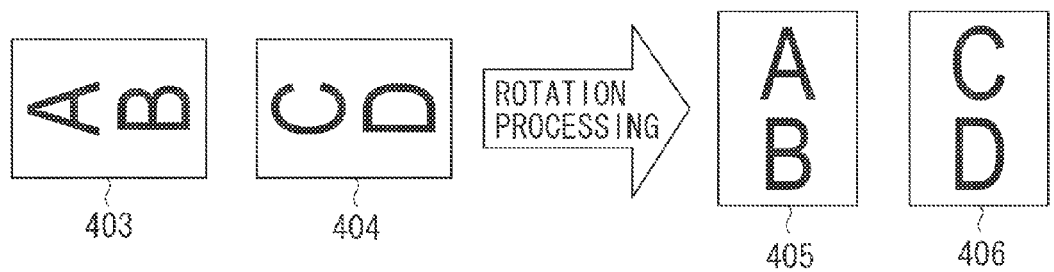
Figure 4C:

FIGS. 4A to 4C illustrate a case where copying is performed using a document 401 and a document 402. In FIGS. 4A to 4C, the user A also desires to obtain a printed result indicated by a sheet 407 (the size thereof is A4R) by performing the 2-in-1 aggregate printing, like in FIGS. 3A to 3C.

The user A first places the document 401 and the document 402 on the scanner 108 of the image processing apparatus 100, as illustrated in FIG. 4A. At this time, the document 401 and the document 402 are placed on the scanner 108 in an A4R orientation, unlike in FIG. 3A.

When the user A sets 2 in 1 using the button 211 on the aggregate printing screen 210 and presses a copy execution button (not illustrated), the scanner 108 reads the document 401 and the document 402, to respectively generate a document image 403 and a document image 404 illustrated in FIG. 4B. However, the aggregate printing cannot be performed for the document image 403 and the document image 404 in an A4R orientation. Therefore, the image processing apparatus 100 performs rotation processing for the generated document images 403 and 404. The rotation processing to be performed is processing for rotating document images through an angle of 90° in a clockwise direction. Rotating the document images 403 and 404 in an A4R orientation through an angle of 90° in a clockwise direction is previously determined as a specification of the image processing apparatus 100. When the rotation processing is performed for the document image 403 and the document image 404, a document image 405 and a document image 406 are respectively obtained.

When the rotation processing for the document images 403 and 404 is completed, the printer 107 performs printing based on the setting as the aggregate printing. The sheet 407 illustrated in FIG. 4C is a sheet on which printing has been performed. In an example illustrated in FIGS. 4A to 4C, the user A can obtain a desired printed result.

While rotating the document images 403 and 404 in an A4R orientation through an angle of 90° in a clockwise direction is previously determined as the specification of the image processing apparatus 100 in FIG. 4B, the specification can be naturally changed if a model or a manufacturer of the image processing apparatus 100 is changed. Image processing apparatuses may differ in a direction in which a document image is rotated depending on a user's setting even if they are the same in model.

Figure 5A:
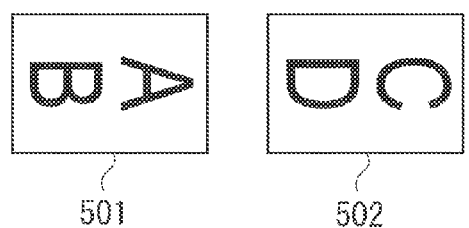
FIGS. 5A, 5B, and 5C illustrate an operation during copying according to the first exemplary embodiment.
Figure 5B:
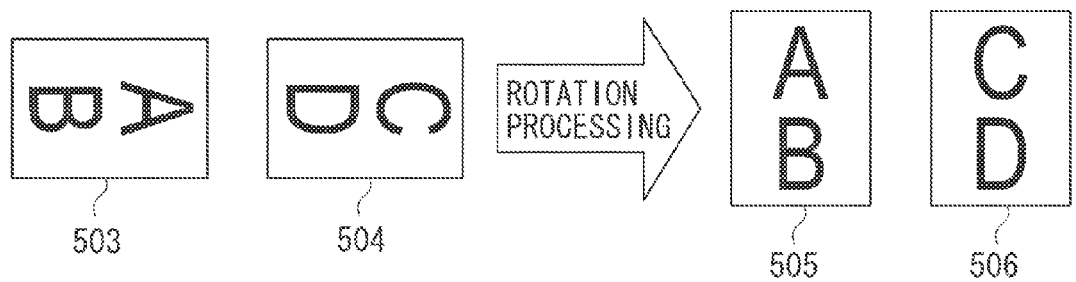
Figure 5C:
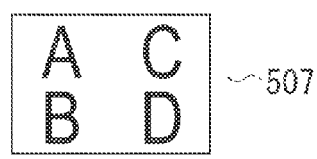

FIGS. 5A to 5C illustrate an image processing apparatus 120 having a specification different from that of the image processing apparatus 100. A configuration of the image processing apparatus 120 is similar to the configuration of the image processing apparatus 100 illustrated in FIG. 1, and hence description thereof is not repeated. In the image processing apparatus 120, it is determined that a document image 503 and a document image 504 in an A4R orientation are rotated through an angle of 90° in a counterclockwise direction when rotated, unlike in the image processing apparatus 100.

A user B of the image processing apparatus 120 desires to obtain a printed result indicated by a sheet 507 (the size thereof is A4R) by performing the 2-in-1 aggregate printing. The user B first places a document 501 and a document 502 in an A4R orientation on a scanner of the image processing apparatus 120. At this time, a direction in which characters are printed differs from that in FIG. 4A because the image processing apparatus 100 and the image processing apparatus 120 differ in rotation specifications of a document image.

When the user B sets 2 in 1 on the aggregate printing screen 210 and presses a copy execution button (not illustrated), the scanner reads the document 501 and the document 502, to respectively generate the document image 503 and the document image 504 illustrated in FIG. 5B. However, rotation processing is performed to perform the aggregate printing, like in FIG. 4B. When the document images 503 and 504 are rotated through an angle of 90° in a counterclockwise direction, a document image 505 and a document image 506 are respectively obtained.

When the rotation processing for the document images 503 and 504 is completed, a printer of the image processing apparatus 120 performs printing based on the setting as the aggregate printing. The sheet 507 illustrated in FIG. 5C is a sheet on which printing has been performed. In an example illustrated in FIGS. 5A to 5C, the user B can obtain a desired printed result.

As described with reference to FIGS. 4A to 4C and FIGS. 5A to 5C, the user A and the user B may respectively understand specifications of the image processing apparatuses 100 and 120 used by themselves and place documents on the scanners in orientations corresponding to the specifications to obtain desired printed results. However, the user B who usually uses the image processing apparatus 120 may not sufficiently understand the specification of the image processing apparatus 100. If the user B desires to perform copying using the image processing apparatus 100, therefore, the user B may not obtain a desired printed result when the user B places the documents on the scanner 108, like when the user B places the documents on the scanner of the image processing apparatus 120. This will be described with reference to FIGS. 6A to 6C.

Figure 6A:
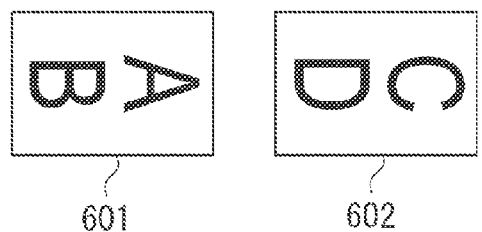
FIGS. 6A, 6B, and 6C illustrate an operation during copying according to the first exemplary embodiment.

The user B desires to obtain the printed result indicated by the sheet 507 illustrated in FIG. 5C and places a document 601 and a document 602 on the scanner 108 of the image processing apparatus 100 in a similar orientation to that illustrated in FIG. 5A, as illustrated in FIG. 6A.

Figure 6B:
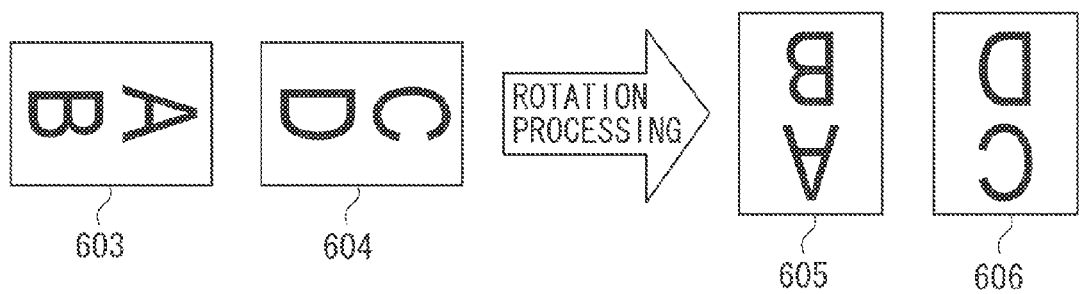

When the user B sets 2 in 1 using the button 211 on the aggregate printing screen 210 and presses a copy execution button (not illustrated), the scanner 108 reads the document 601 and the document 602, to respectively generate a document image 603 and a document image 604 illustrated in FIG. 6B. However, the aggregate printing cannot be performed for the document images 603 and 604 in an A4R orientation. Therefore, the image processing apparatus 100 performs rotation processing for the generated document images 603 and 604. The rotation processing to be performed is processing for rotating document images through an angle of 90° in a clockwise direction. When the rotation processing is performed for the document image 603 and the document image 604, a document image 605 and a document image 606 are respectively obtained.

Figure 6C:
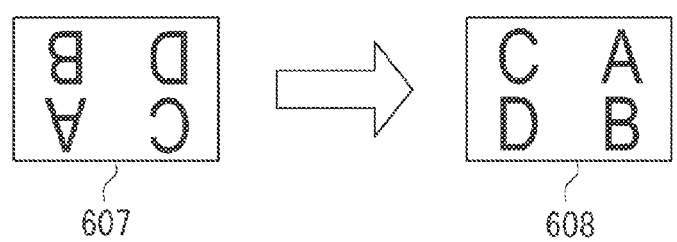

When the rotation processing for the document images 603 and 604 is completed, the printer 107 performs printing based on the setting as the aggregate printing. A sheet 607 illustrated in FIG. 6C is a sheet on which printing has been performed. When the top and the bottom of the sheet 607 are reversed, a sheet 608 is obtained. However, the sheet 608 does not indicate a printed result intended by the user B because the user B places the documents 601 and 602 on the scanner 108 of the image processing apparatus 100 in the same orientation as that in the image processing apparatus 120 while not knowing that the image processing apparatus 100 and the image processing apparatus 120 differ in a method for rotating document images.

As described above with reference to FIGS. 6A to 6C, a printed result unintended by the user may be obtained by the rotation processing for rotating the document images. When printing unintended by the user is performed, sheets and toners may be uselessly consumed. Therefore, the present exemplary embodiment is configured to display a print preview when the rotation processing for rotating the document images is performed, to allow the user to confirm whether a printed result intended by the user is obtained.

Figure 7A:
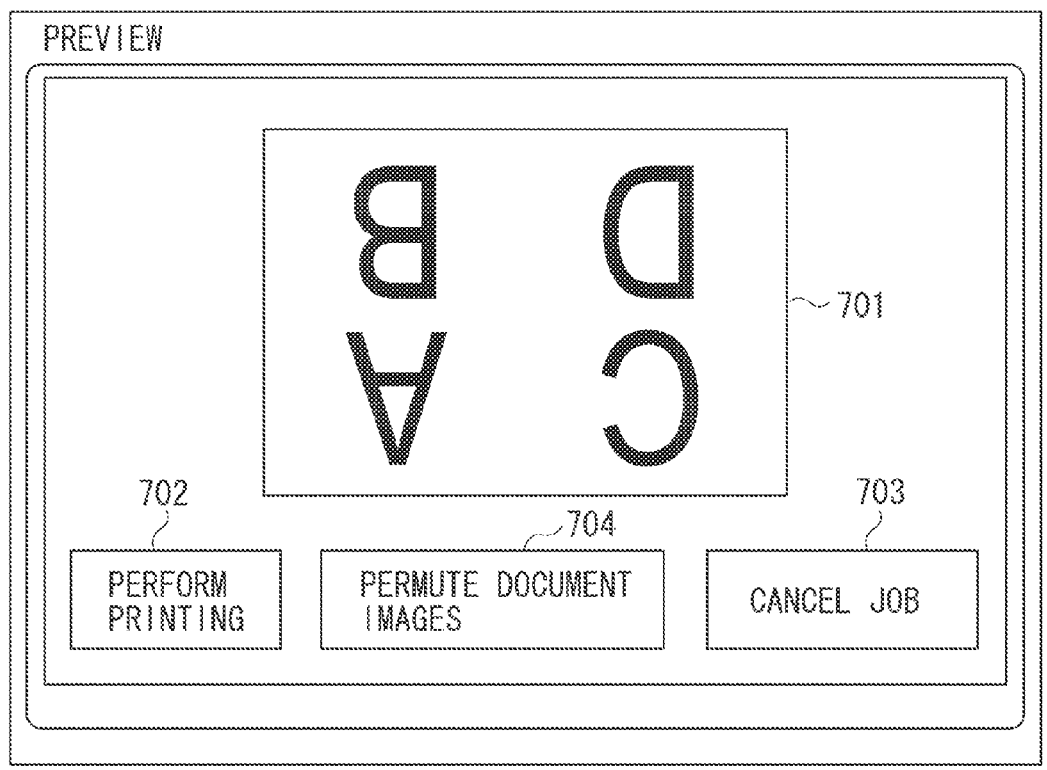
FIGS. 7A and 7B illustrate print previews according to the first exemplary embodiment.
Figure 7B:
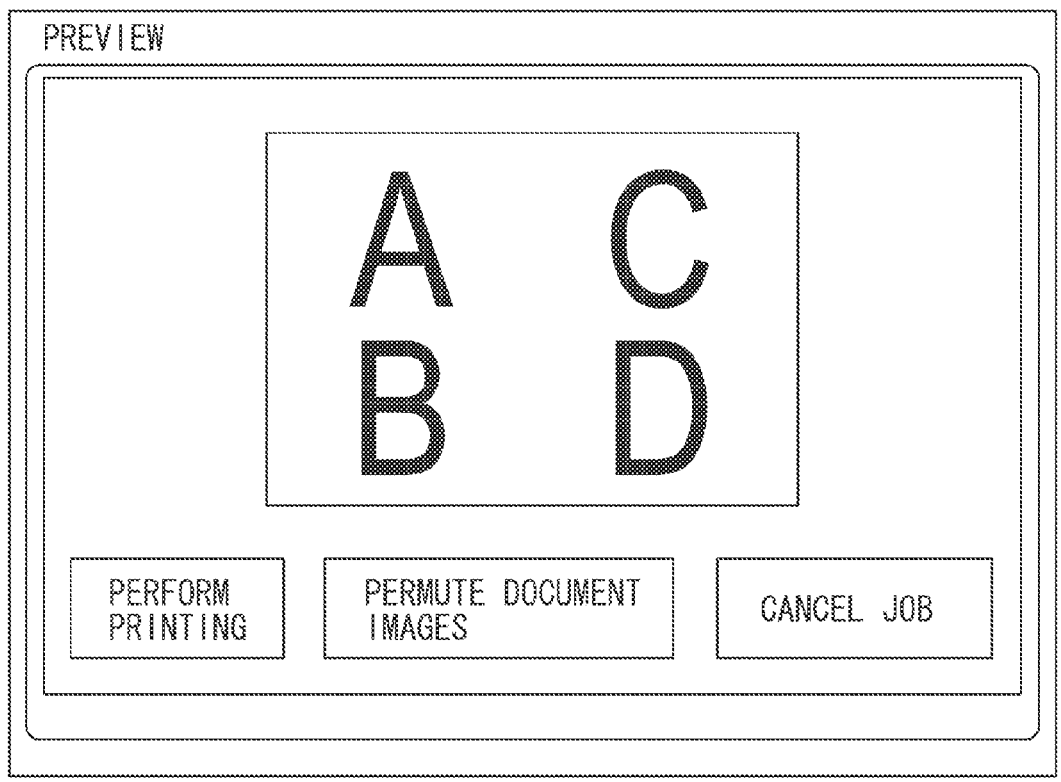

FIGS. 7A and 7B illustrate preview screens displayed on the operation unit 105 in the image processing apparatus 100 when the CPU 101 in the image processing apparatus 100 determines that rotation processing is performed for a document image.

A preview screen 700 illustrated in FIG. 7A is displayed in a case described in FIGS. 6A to 6C. A document image 701 is printed on a sheet, and is laid out based on the setting as aggregate printing. A user confirms the document image 701, to determine whether a desired printed result is obtained. In the case described in FIGS. 6A to 6C, the user B places the documents in an erroneous direction on the scanner 108 so that a printed result intended by the user B is not obtained. On the other hand, a preview screen 710 illustrated in FIG. 7B is displayed in a case described in FIGS. 4A to 4C. In the case described in FIGS. 4A to 4C, the user A places the documents in a correct direction on the scanner 108 so that a printed result intended by the user is obtained.

The user, who has confirmed the preview screen 700 or the preview screen 710, can perform desired processing out of execution of printing, cancellation of a job, and permutation of document images. When the user selects a button 702, the image processing apparatus 100 performs printing. When the user selects a button 703, the image processing apparatus 100 cancels a job. When the user selects a button 704, the image processing apparatus 100 permutes document images. The permutation of document images will be described with reference to FIGS. 8A and 8B.

Figure 8A:
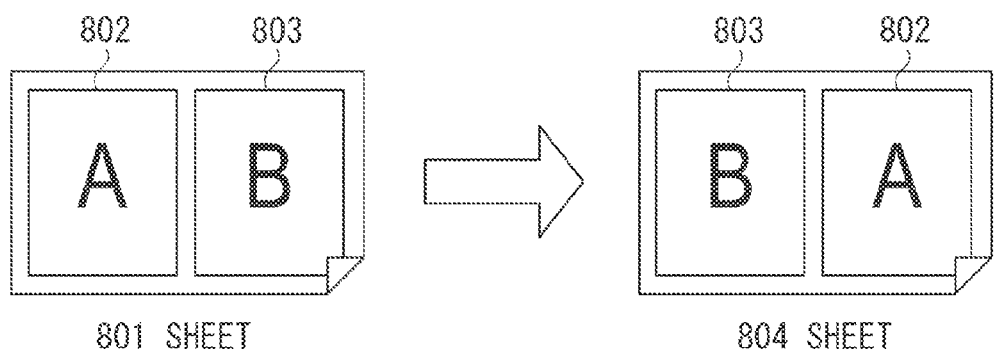
FIGS. 8A and 8B illustrate permutation of document images according to the first exemplary embodiment.
Figure 8B:
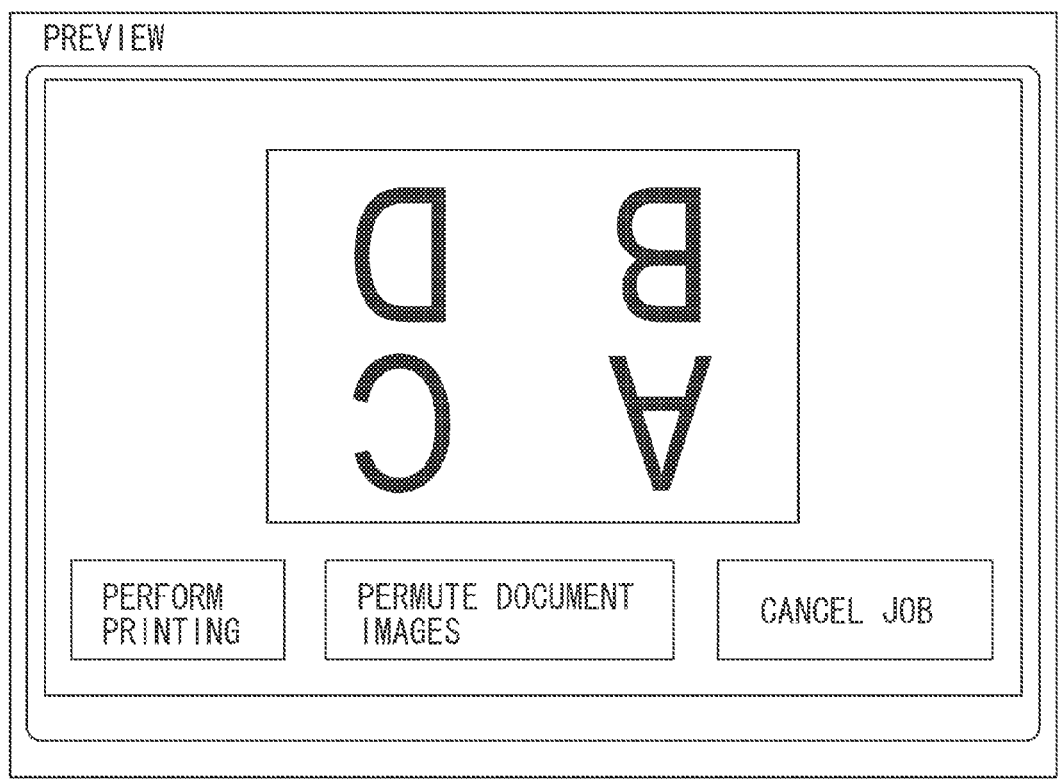

FIG. 8A illustrates the permutation of document images in the case of 2 in 1 as an example of the aggregate printing. A document image 802 and a document image 803 are laid out on a sheet 801. When the user selects the button 704 on the preview screen 700, a layout is changed so that respective positions of the document image 802 and the document image 803 are permuted, as indicated by a sheet 804. When the user selects the button 704 on the preview screen 700, therefore, a preview screen 810 illustrated in FIG. 8B is displayed. The document images 802 and 803 are thus permuted so that the user can obtain a desired printed result even when documents are placed in an erroneous direction on the scanner 108, like in the case described in FIGS. 6A to 6C. Time and labor required for the user to perform the copy setting such as the aggregate printing again to obtain a desired printed result and further scan the documents again can be reduced. In addition, the document image 802 and the document image 803 may be not only permuted but also rotated through an angle of 180°.

Display of the print preview in the present exemplary embodiment will be described below with reference to a flowchart illustrated in FIG. 9. In steps S901 to S910 illustrated in FIG. 9, the CPU 101 in the image processing apparatus 100 loads a program stored in a memory such as the ROM 102 into the RAM 103 and executes the program.

A user sets 2 in 1, for example, as the aggregate printing on the aggregate printing screen 210 illustrated in FIG. 2B, and presses a copy execution button (not illustrated). In step S901, the CPU 101 causes the scanner 108 to read a placed document to generate a document image.

In step S902, the CPU 101 then determines whether rotation processing is to be performed for the document images. In the present exemplary embodiment, the CPU 101 determines that the rotation processing is to be performed for the document images when required to perform the aggregate printing, as illustrated in FIGS. 4A to 4C or FIGS. 6A to 6C, for example. If the CPU 101 determines that the rotation processing is to be performed (YES in step S902), the processing proceeds to step S903. On the other hand, the CPU 101 determines that the rotation processing is not to be performed for the document image when not required to perform the aggregate printing, as illustrated in FIGS. 3A to 3C, for example. If the CPU 101 determines that the rotation processing is not to be performed (NO in step S902), the processing proceeds to step S910. In step S910, the CPU 101 causes the printer 107 to perform printing based on the document images and the setting as the aggregate printing. The CPU 101 causes the printer 107 to perform printing without performing display of a preview screen, described below. If the user specifies that the print preview is to be displayed before printing is performed, the print preview may be displayed even if the CPU 101 determines that the rotation processing is not to be performed in step S902.

In step S903, the CPU 101 performs the rotation processing for the document images. In the present exemplary embodiment, the document images are rotated through an angle of 90° in a clockwise direction as the rotation processing.

In step S904, the CPU 101 causes the operation unit 105 to display a print preview before printing is performed. The print preview displayed in step S904 includes the preview screen 700 or the preview screen 710 respectively illustrated in FIGS. 7A and 7B. The document images for which the rotation processing has been performed are laid out and displayed based on the setting as the aggregate printing. The user can confirm whether a printed result intended by the user is obtained by confirming the print preview displayed in step S904.

In step S905, the CPU 101 then determines whether a user's operation has been input via the operation unit 105. If the CPU 101 determines that the user's operation has been input via the operation unit 105 (YES in step S905), the processing proceeds to step S906. On the other hand, if the CPU 101 determines that the user's operation has not been input via the operation unit 105 (NO in step S905), the user waits until the user selects the button.

In step S906, the CPU 101 then determines whether document images are to be permuted. In the present exemplary embodiment, the CPU 101 determines that the document images are to be permuted when the user selects the button 704. If the CPU 101 determines that the document images are to be permuted (YES in step S906), the processing proceeds to step S907. In step S907, the CPU 101 changes a layout so that the document image 802 and the document 803 are permuted, as described in FIG. 8A, and the processing returns to step S904. In step S904, the CPU 101 causes the operation unit 105 to display the print preview based on the layout after the change. While the document images on a one-page sheet are permuted in the present exemplary embodiment, the sheet may naturally include a plurality of pages. Therefore, the CPU 101 may be responsive to the document images on the one-page sheet having been permuted in step S907, to perform similar processing for the other page.

If the CPU 101 determines that the document images are not to be permuted (NO in step S906), the processing proceeds to step S908. In step S908, the CPU 101 determines whether a job is to be canceled. In the present exemplary embodiment, the CPU 101 determines that the job is to be canceled when the user selects the button 703. If the CPU 101 determines that the job is to be canceled (YES in step 908), the processing illustrated in the flowchart ends. On the other hand, if the CPU 101 determines that the job is not to be canceled (NO in step S908), the processing proceeds to step S909.

In step S909, the CPU 101 determines whether printing is to be performed. In the present exemplary embodiment, the CPU 101 determines that the printing is to be performed when the user selects the button 702. If the CPU 101 determines that the printing is to be performed (YES in step S909), the processing proceeds to step S910. In step S910, the CPU 101 causes the printer 107 to perform printing based on the document images and the setting as the aggregate printing.

On the other hand, if the CPU 101 determines that the printing is not to be performed (NO in step S909), the processing proceeds to step S911. In step S911, the CPU 101 performs processing based on the input user's operation. If an operation for displaying the document image 701 on the preview screen 700 in an enlarged manner is input, for example, enlargement processing for enlarging the document image 701 is performed.

As described above, according to the present exemplary embodiment, if the rotation processing for rotating the document images is performed, the print preview is displayed. Thus, the user can confirm whether a desired printed result is obtained. The layout for the aggregate printing can be changed via the preview screen. Therefore, time and labor for the user to perform the copy setting such as the aggregate printing again to obtain the desired printed result, and further scan the documents again can be reduced.

In the first exemplary embodiment, the print preview is displayed when the rotation processing is performed for the document images, considering that a printed result unintended by the user may be obtained by the rotation processing, as described in FIGS. 6A to 6C. However, a print preview may not need to be displayed even if rotation processing is performed, e.g., if aggregate printing is not set, although details thereof will be described below with reference to FIGS. 10A to 10C and FIGS. 11A to 11C. A second exemplary embodiment provides a configuration for selecting whether the print preview is to be displayed depending on the presence or absence of the setting as the aggregate printing even if the rotation processing is performed.

FIGS. 10A to 10C illustrate a case where a user A performs copying using a document 1001. The user A places the document 1001 on the scanner 108, as illustrated in FIG. 10A. At this time, the document 1001 is placed in an A4R orientation.

When the user presses a copy execution button (not illustrated), the scanner 108 reads the document 1001 to generate a document image 1002 illustrated in FIG. 10B. In the present exemplary embodiment, a sheet of A4R size is not set in the image processing apparatus 100, and only a sheet of A4 size is set thereon. In this case, rotation processing is performed for the document image 1002, to obtain a document image 1003.

When the rotation processing for the document image 1002 is completed, a printer 107 performs printing based on the document image 1003. A sheet 1004 illustrated in FIG. 10C is a sheet on which printing has been performed.

Figure 11A:
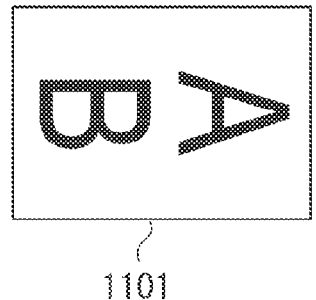
FIGS. 11A, 11B, and 11C illustrate an operation during copying according to the second exemplary embodiment.
Figure 11B:
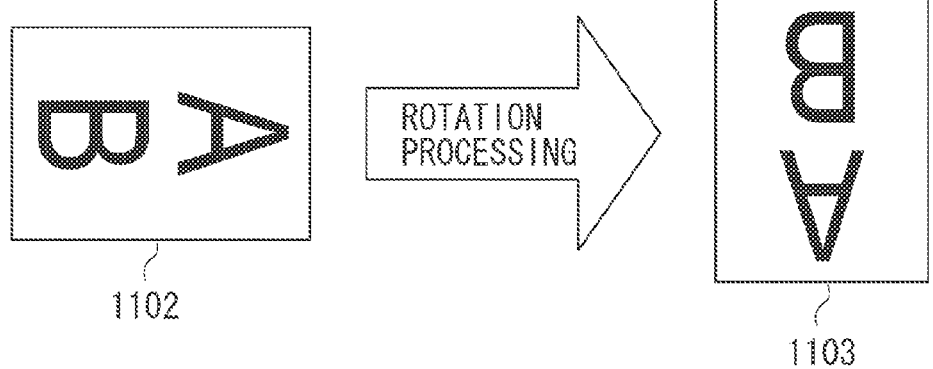
Figure 11C:
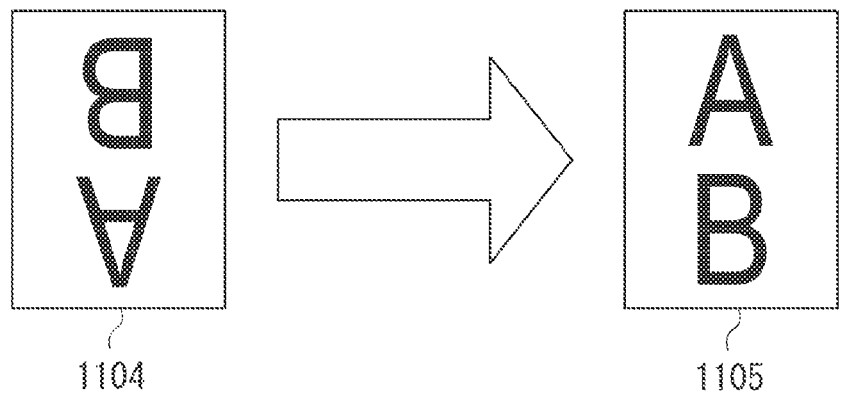

FIGS. 11A to 11C illustrate a case where a user B performs copying using a document 1001. The user B places the document 1101 on the scanner 108, as illustrated in FIG. 11A. At this time, while the document 1101 is placed in an A4R orientation, the document 1101 differs from the document 1001 in a direction in which characters are printed.

When the user B presses a copy execution button (not illustrated), the scanner 108 reads the document 1101 to generate a document image 1102 illustrated in FIG. 11B. A sheet of A4R size is not set in the image processing apparatus 100, and only a sheet of A4 size is set thereon, like in FIGS. 10A to 10C. In this case, rotation processing is performed for the document image 1102, to obtain a document image 1103.

When the rotation processing for the document image 1102 is completed, the printer 107 performs printing based on the document image 1103. A sheet 1104 illustrated in FIG. 10C is a sheet on which printing has been performed. When the user reverse the top and the bottom of the sheet 1104, a sheet 1105 is obtained. The sheet 1105 indicates the same printed result as that indicated by the sheet 1004 illustrated in FIG. 10C.

As described above, in both FIGS. 10A to 10C and 11A to 11C, the aggregate printing is not set regardless of the rotation processing for the document image being performed. Therefore, a printed result intended by the user is obtained. Therefore, in the present exemplary embodiment, if the aggregate printing is not set even when rotation processing is performed, printing is performed without displaying the print preview.

Figure 12:
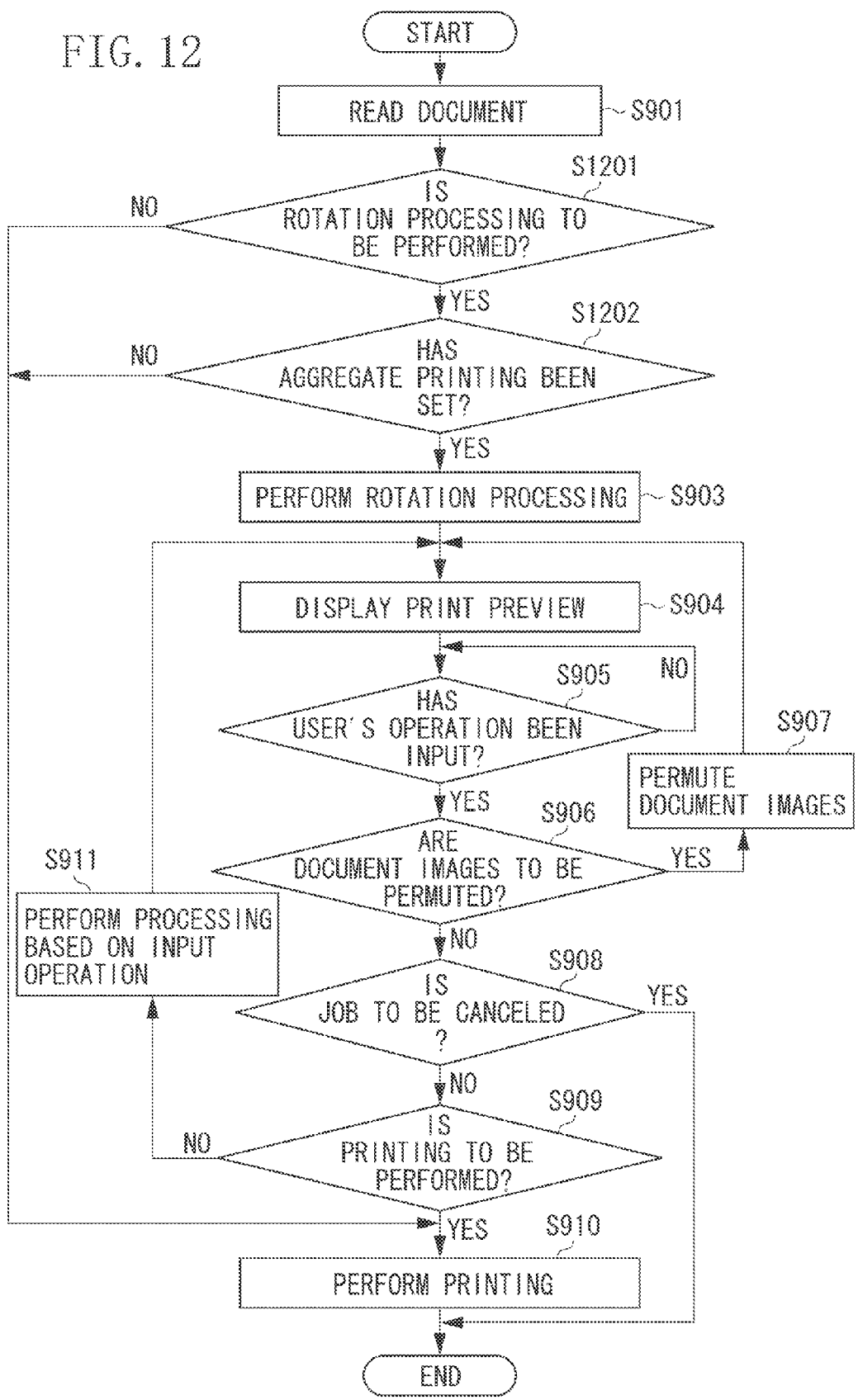
FIG. 12 is a flowchart relating to display of a print preview according to the second exemplary embodiment.
Figure 13A:
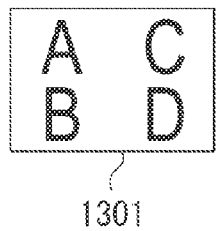
FIGS. 13A, 13B, 13C, and 13D illustrate rotation of document images.
Figure 13B:
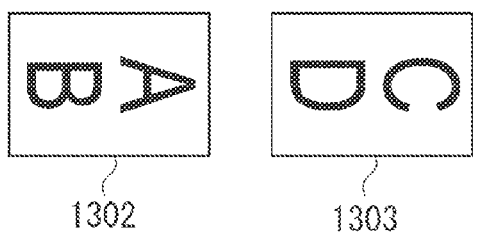
Figure 13C:
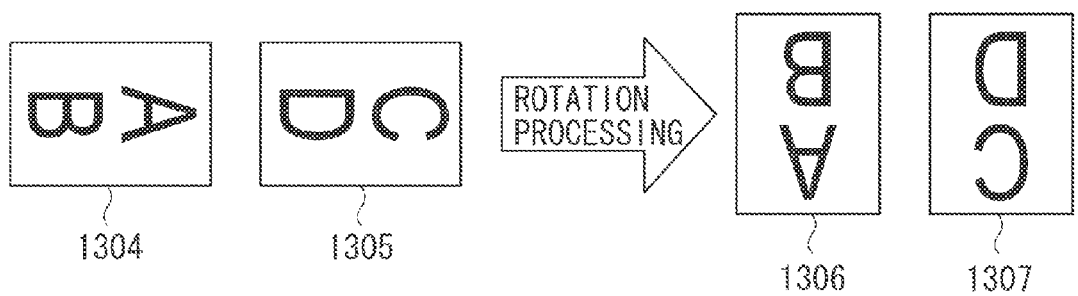
Figure 13D:
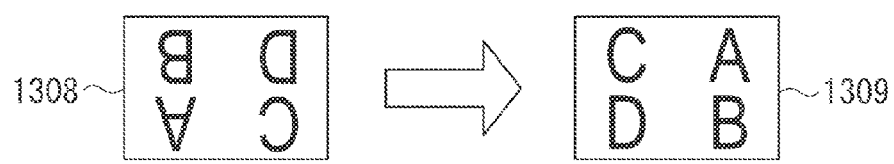

The display of the print preview in the present exemplary embodiment will be described below with reference to a flowchart illustrated in FIG. 12. Steps illustrated in FIG. 12 are processed when the CPU 101 in the image processing apparatus 100 loads a program stored in a memory such as the ROM 102 into the RAM 103 and executes the program. Similar processing as that in the flowchart illustrated in FIG. 9 is performed in steps assigned the same numbers as those in the flowchart illustrated in FIG. 9, and hence description thereof is not repeated.

If the user performs a desired copy setting and presses a copy execution button (not illustrated), then in step S901, the CPU 101 causes the scanner 108 to read a placed document to generate a document image.

In step S1201, the CPU 101 then determines whether rotation processing is to be performed for the document image. In the present exemplary embodiment, the CPU 101 determines that the rotation processing is to be performed for the document image when required to be performed for the document image, as illustrated in FIGS. 4A to 4C and FIGS. 6A to 6C and FIGS. 10A to 10C and FIGS. 11A to 11C. If the CPU 101 determines that the rotation processing is to be performed (YES in step S1201), the processing proceeds to step S1202. If the user specifies that the print preview is to be displayed before printing is performed, the print preview may be displayed even if the CPU 101 determines that the rotation processing is not to be performed (NO in step S1201).

In step S1202, the CPU 101 determines whether the aggregate printing has been set. If the CPU 101 determines that the aggregate printing has been set (YES in step S1202), the processing proceeds to step S903. In step S903, the CPU 101 displays the print preview. On the other hand, if the CPU 101 determines that the aggregate printing has not been set (NO in step S1202), the processing proceeds to step S910. In step S910, the CPU 101 causes the printer 107 to perform printing without displaying the print preview. If the user specifies that the print preview is to be displayed before printing is performed, then in step S1202, the print preview may be displayed even if the CPU 101 determines that the aggregate printing has not been set (NO in step S1202).

As described above, according to the present exemplary embodiment, even when the rotation processing is performed, the printing is performed without displaying the print preview if the aggregate printing has not been set. Thus, the user may confirm the print preview if the possibility that a desired printed result is not obtained becomes higher, i.e., if the aggregate printing has been set and the rotation processing is to be performed. Therefore, user's time and labor are reduced.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-278700 filed Dec. 20, 2011, which is hereby incorporated by reference herein in its entirety.

What is claimed is:

1. An image processing apparatus comprising:
   a reading unit configured to read a document to generate a document image;
   a determination unit configured to determine whether rotation processing for rotating the document image is to be performed when printing is performed based on the document image;
   a display unit configured to display a print preview representing a printed result; and
   a setting unit configured to set aggregate printing for aggregating a plurality of document images to one sheet and printing the aggregated document images thereon,
   wherein the display unit displays the print preview if the determination unit determines that the rotation processing is to be performed and the setting unit sets the aggregate printing.

2. The image processing apparatus according to claim 1, further comprising a printing unit configured to perform printing based on the document image.

3. The image processing apparatus according to claim 2, wherein the display unit displays the print preview before the printing unit performs the printing, and
   wherein the printing unit performs the printing in response to a printing instruction input by a user when the display unit is displaying the print preview.

4. The image processing apparatus according to claim 2, wherein the printing unit performs the printing, without the display unit displaying the print preview, if the determination unit determines that the rotation processing is not to be performed.

5. The image processing apparatus according to claim 1, wherein the display unit displays the print preview if an instruction for displaying the print preview is input by a user even if the determination unit determines that the rotation processing is not to be performed.

6. A method for controlling an image processing apparatus, the method comprising:
   reading a document to generate a document image;
   determining whether rotation processing for rotating the document image is to be performed when printing is performed based on the document image;
   setting aggregate printing for aggregating a plurality of document images to one sheet and printing the aggregated document images thereon;
   displaying a print preview representing a printed result if it is determined that the rotation processing is to be performed and that the aggregate printing is set.

7. A non-transitory computer-readable storage medium storing a program that causes a computer to perform the method according to claim 6.

* * * * *